Feb. 13, 1934.  R. PLASTINO  1,947,018
COURSE INDICATING AND SIGNALING APPARATUS
Filed Nov. 26, 1927   3 Sheets-Sheet 3
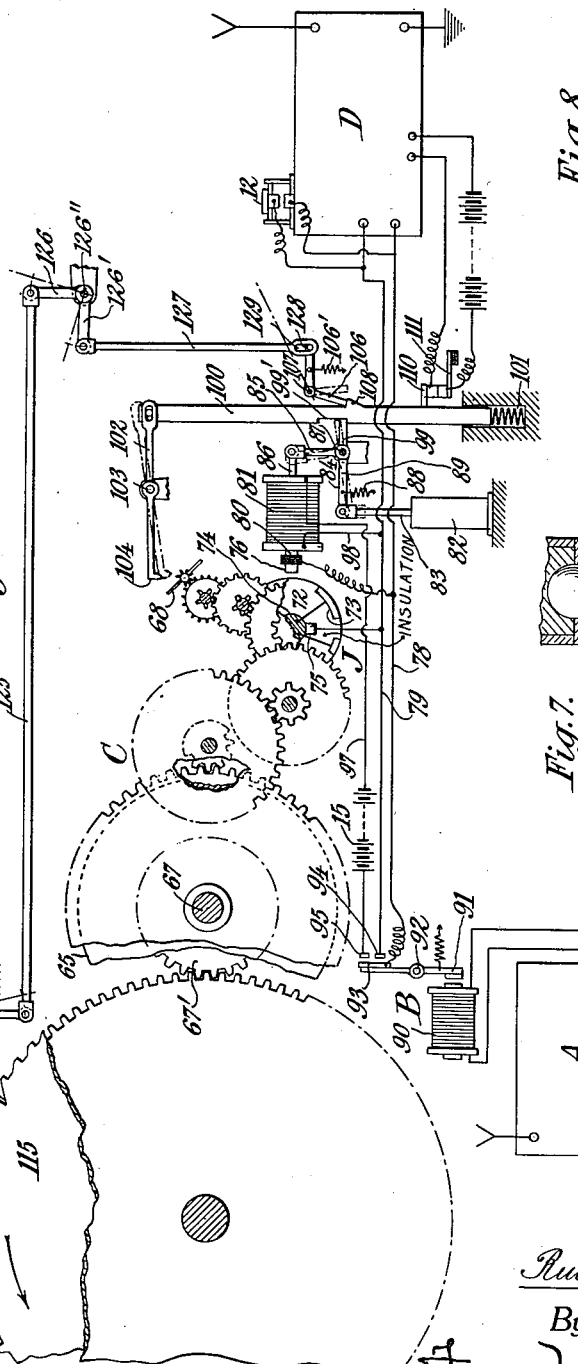
INVENTOR:
Rubino Plastino,
By Attorneys,
Fraser, Myers & Manley Patented Feb. 13, 1934

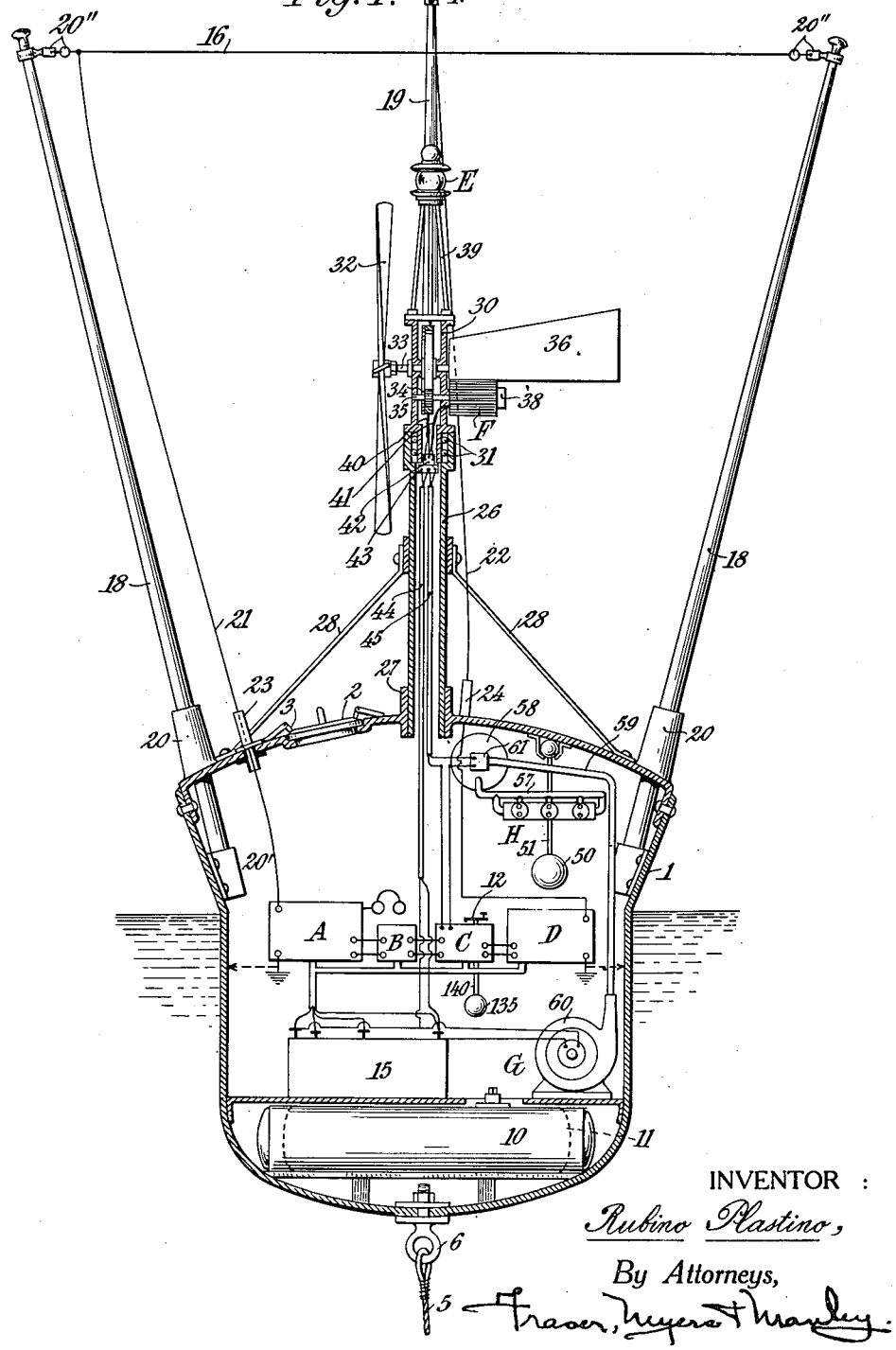

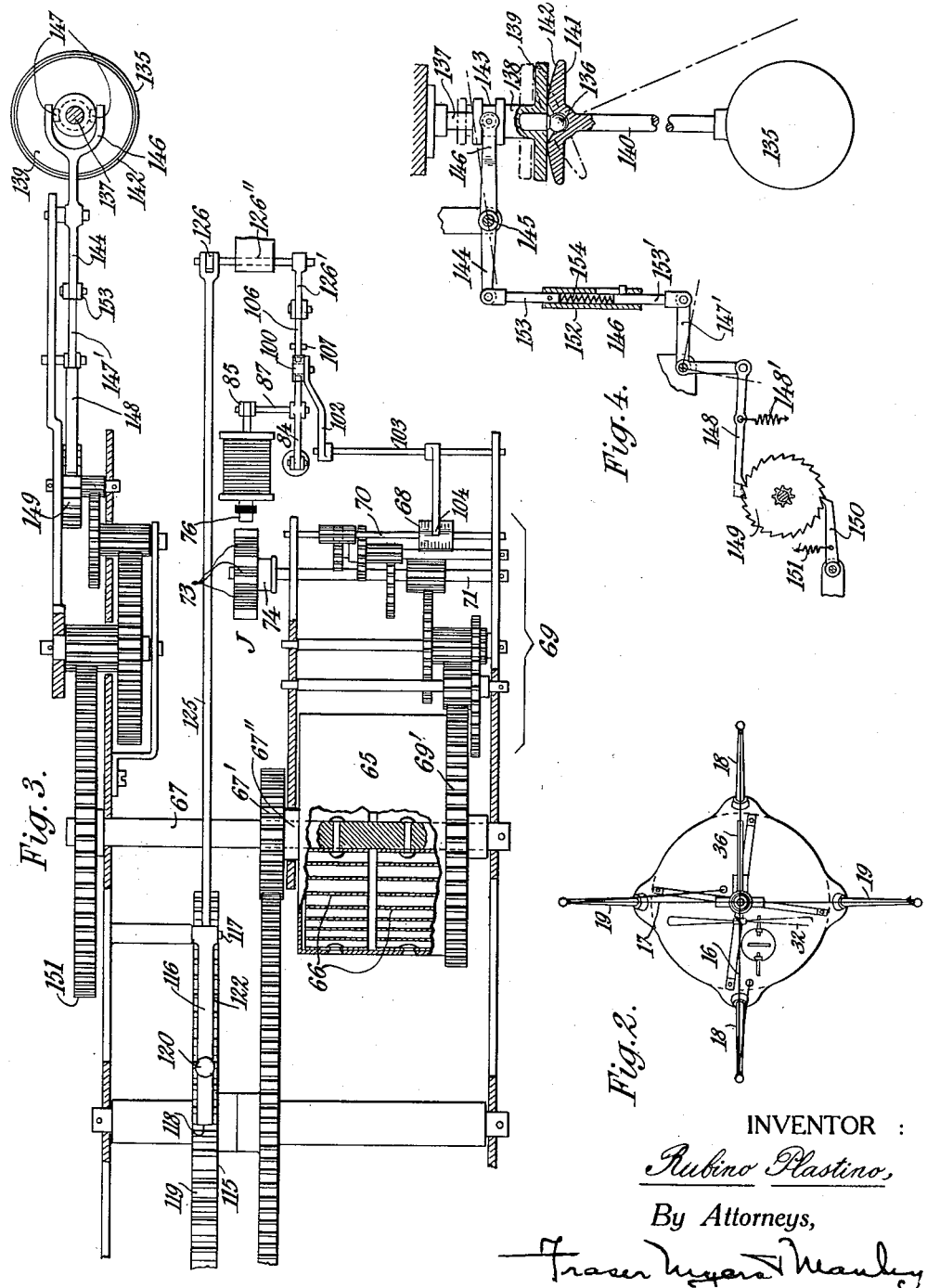

1,947,018

UNITED STATES PATENT OFFICE 1,947,018

COURSE INDICATING AND SIGNALING APPARATUS

Rubino Plastino, New York, N. Y.

Application November 26, 1927
Serial No. 235,879

5 Claims. (Cl. 250—2)

This invention relates to improvements in safety depot systems providing course-indicating and signaling apparatus primarily adapted for aiding navigation by air or otherwise over large bodies of water, although certain features of the invention are equally well adapted for use in connection with aviation over land.

One object of the invention is to provide beacons which are controlled by wireless from craft seeking information as to their location, the transmitter on a craft acting to put the beacon into operation, so that either a light or wireless signal, or both, will be radiated therefrom for a predetermined time after the said transmitter has put the beacon into operation.

A further object of the invention is to provide a safety depot which will automatically serve as a retransmitting or relay station for wireless signals whereby the comparatively weak signal transmitted from the low power wireless equipment of an airplane, for example, will be picked up and retransmitted with greatly amplified intensity.

The invention further contemplates means whereby the operator of a transmitter carried by an airplane, for example may solely by wireless control throw out of operation an automatic signal or call letter transmitter, and utilize the transmitting facilities thereof as a retransmitting means for the signals which he sends from the airplane.

A further object of the invention is to provide an automatic and self-contained wireless transmitting or retransmitting depot which is capable of storing up electrical energy developed by the power of the wind or other natural forces.

Another object of the invention is to provide floating safety depots which through radiation of light or wireless signals, or both, make known to the navigator the location of the depot, and provide emergency signaling facilities which may be used directly when access is had to the depot, the depot also providing storage space for emergency food rations, fuel, and the like.

In the case of a floating depot, novel means are provided to store the energy of the waves, which cause the depot to roll, so that such energy will be available for operating a beacon light or wireless transmitter when occasion demands.

Another object of the invention is to provide a self-winding timing apparatus which when set in motion under the control of a signal from a remote point, will automatically actuate signal transmitting means for a predetermined period and thereafter put such means out of operation until again called for by a subsequent signal.

Further objects of the invention will be apparent from the following description, in which reference is had to the accompanying drawings, wherein—

Figure 1 is a central vertical section of a safety depot according to the present invention.

Fig. 2 is a plan view of the same.

Fig. 3 is a plan view of the self-winding timing mechanism for regulating the transmission of wireless and light signals.

Fig. 4 is a side elevation of the pendulum self-winding device for mechanism shown in Fig. 3.

Fig. 5 is a side elevation of the mechanism shown in Fig. 3, with the exception of the automatic winding device, and also shows diagrammatically the electrical connections and transmitting equipment which the mechanism controls.

Fig. 6 shows diagrammatically an arrangement of beacons or depots according to the present invention, as they would be used for marking transocean air-ways, for example.

Fig. 7 is a fragmentary vertical axial section of the pendulum-driven air pump.

Fig. 8 is an enlarged central horizontal cross-section of the electrically-controlled valve for the air flask illustrated in Fig. 1.

Particularly in the case of aerial navigation, it has been found difficult, if not impossible, under adverse weather conditions, for the pilot to ascertain the location or course of his machine in making flights over the open sea. Cross winds frequently drive such craft far from their intended course, and radio beacon devices provided at various points on land are often of little use because under poor atmospheric conditions it is practically impossible for them to co-operate with the airplane or other craft far at sea. Furthermore, such land beacons, even where their signals can be received by an airplane, cannot give the pilot any accurate information as to his progress across the ocean, but merely give him a general idea as to whether he is far off the intended course or not. It is also true that the wireless transmitting equipment which can be carried by airplanes has a necessarily limited range, which makes ship to shore communication unreliable, and under adverse conditions quite impossible over any considerable distance. In the event of a forced landing there is always great risk that the comparatively feeble signal from the airplane will not be intercepted, and, as has already been pointed out, even though the craft succeeds in establishing communication with a receiving station, the pilot is unable to give any definite information as to his whereabouts, so that it is impossible to send out a rescue party with any definite knowledge as to the location of the fallen machine.

The solution of these problems according to the present invention lies in providing a number of safety depots at suitable intervals along proposed ocean routes, these depots being anchored at definite locations which will be accurately indicated on navigation charts. Each will be preferably provided with radio-transmitting apparatus capable of automatically sending characteristic signals which distinguish the several depots one from the other, and, in addition, the depots will provide characteristic beacon lights which will intermittently flash light signals which give the location or identity of the depot. The transmitting and the signal light equipment of each depot is adapted to be controlled by signals from the airplane or other craft, so that the depot only functions as a beacon when actually required, or for limited periods when required. In addition to this, the wireless transmitter carried by the airplane can take control of the transmitting apparatus in a depot and utilize such apparatus as a relay for signals which would be in themselves too weak to reach a distant station where there would be an operator who could co-operate with the airplane station.

The safety depots according to the present invention are substantially self-sustaining, generating the power required for signaling through the action of the wind and the motion of the waves, so that the depot will require human attention and service only at intervals of several months or longer. It will be apparent that such depots may be employed as an emergency refuge for crews and passengers who may be forced to descend on the sea, and may contain emergency supplies sufficient to take care of those forced to make use of the depot until a rescue party can reach them. The transmitting apparatus is so designed that it may be directly operated from within the depot, so that a party having access thereto may readily communicate with a distant station.

It will be apparent that the depots according to the present invention may be utilized by ordinary marine traffic either as beacons or as wireless relay stations.

Having set forth the general principles of the present invention, the actual mechanism and construction of certain embodiments thereof will be described with reference to the accompanying drawings.

The depot equipped with automatic apparatus according to the present invention, as shown in Figs. 1 and 2, comprises a cylindrical floating vessel or chamber 1 which may be formed of metal plates riveted together in accordance with regular ship building practice. The chamber is sealed by a manhole cover 2 which is securely clamped in posiiton by any suitable locking device such as the lever locks 3. A mooring cable 5 is attached centrally at the base of the chamber to a mooring ring 6, the cable being of sufficient length to permit the chamber to ride freely over waves of any size that may be encountered, without being submerged by the pull of the cable. The cable will be securely anchored on the bed of the ocean, so that the station or depot will occupy its assigned position along a given route, the necessary slack permitting the station to shift with the wind only comparatively short distances. If desired, tanks 10, 11 may be provided in the base of the chamber, in which may be stored emergency supplies of water and fuel for those who in an emergency may have occasion to use the depot as a refuge.

The depot is provided, as diagrammatically indicated in Fig. 1, with a wireless receiving apparatus A, and a relay B controlled by the receiver, which in turn controls an automatic signaling or signal timing mechanism C and a wireless transmitter D. The co-operative relationship between these several electrical devices will be hereinafter more fully set forth, it being noted for the present that a party making use of the station in an emergency has at his disposal the wireless receiving apparatus A and wireless transmitting apparatus D, by means of which he can communicate with a shore station or passing ships. For such direct use of the apparatus the transmitter is controlled by means of the usual hand-operated key 12.

The required current for operating the wireless and beacon light E hereinafter to be described, is supplied from an accumulator or storage battery 15, which in turn is kept charged by a wind-driven generator F, or a generator G driven by a wave motor H, as will hereinafter more fully appear.

Separate sending and receiving antennæ 16 and 17 are provided, the two being supported at right angles, and one above the other, by means of inclined antenna masts 18, 19, which are rigidly mounted in fittings 20 secured to the deck plates of the chamber 1. The foot of each mast extends through the fittings 20 and is securely clamped to the inclined walls of the chamber in a socket member 20'. The antennæ may be of any desired form suitably insulated from the masts by insulators 20''. The antenna lead-in wires 21, 22, of the receiving and sending apparatus respectively, are sealed in water-tight insulating tubes 23, 24, which pass through the deck plates of the chamber. The wireless apparatus is grounded directly to the chamber plates, the mooring cable 5 providing an effective counterpoise, as will be readily understood.

Projecting vertically from the center of the chamber deck is a hollow tubular mast 26 which at its base is securely mounted in a fitting 27, inclined bracing struts 28 being provided to insure adequate strength. Rotatably mounted at the upper end of the tubular mast 26 is a mast extension 30, this mast extension providing a housing and supports for the wind-driven generator F. The said mast extension fits into the cylindrical head of the mast proper, any suitable form of anti-friction bearing, such as the double race ball bearing 31, being provided between the two to insure free rotation of the mast extension. A windmill 32 of any suitable design, having its vanes mounted upon a horizontal shaft 33, is supported by the mast extension. An internally-toothed gear ring is rigidly fastened to the shaft 33 and meshes with a pinion 34 carried upon the generator shaft 35. A vertical vane 36 of suitable size is rigidly mounted upon the mast extension parallel to the axis of the shaft 33, the object of this vane being to always maintain the windmill in an efficient relation to the wind regardless of the direction from which the wind is blowing. Within a housing 38 connected to the generator, any suitable circuit-controlling device may be provided to insure the disconnection of the generator from the accumulator or storage battery during periods when the voltage output of the generator is unsuitable for charging purposes. There are numerous well-known circuit-controlling devices of this nature, and since the use of such devices is purely incidental to the operation of the apparatus according to the present invention, a detailed description thereof is not required. The beacon light E previously referred to is mounted upon a tripod 39 secured to the rotatable extension 30. The wires 40 which supply current to the light, and also the generator leads 41, terminate in a head 42 mounted in the lower end of the mast extension 30, this head being adapted to make individual contacts with a stationary collector head 43, whereby the circuits of the beacon light E and the generator F may be maintained through connecting wires extending downward through conduits 44, 45, in the hollow mast 26, regardless of the relative movement that may occur between the rotatable mast extension and the mast itself.

A second electrical generating system wholly independent of the wind-driven generator hereinbefore described, may be provided within the floating chamber 1. This generator is driven by energy supplied by a universally mounted pendulum 50 which executes movements relative to its mounting whenever wind or wave motion causes the chamber to rock. The mechanism, being entirely enclosed, is not subject to derangement through the direct action of waves which might in severe storm conditions dash over the chamber, nor would it be affected by the formation of ice in cold weather, which would under certain circumstances prevent the operation of an external windmill. In the present instance the pendulum rod 51 is connected to the pistons of a radial cylinder air compressor, the cylinders being symmetrically arranged around the pendulum rod. Regardless of the direction of motion of the pendulum, there will always be one pair of cylinders which are receiving substantially the direct thrust of the pendulum. As shown in Fig. 7, connecting rods 52 interposed between the air compressor pistons 53 and the pendulum are connected both to the pistons and the pendulum rod by means of ball and socket joints 54. The pistons aligned at an angle to the plane of motion of the pendulum will receive only a minor component of the pendulum's motion, and will be practically inoperative, the pistons lying substantially in the plane of said motion being relied upon to effect the compression of air. Each cylinder is provided with automatic spring-pressed intake and exhaust check valves 55 and 56 respectively, the combined exhaust of the several cylinders entering a manifold 57 which delivers the compressed air to a flask or reservoir 58.

The compressed air stored in flask 58 is delivered through a conduit 59 to a motor 60 which drives the generator G. The flow of air to the motor is determined by an electrically-controlled valve 61 interposed between the air flask and the conduit 59. As shown in the detailed view of Fig. 8, the electrically-controlled valve 61 comprises a valve housing 61a having a passage 61b, which connects the conduit 59 with the interior of air flask 58. This passage is controlled by a mushroom valve 61c which is normally pressed against its conical seat 61d by a valve spring 61e, which acts upon the stem 61f of the valve. The valve is retained or locked in its closed position against the pressure of air which is gradually built up within the flask by means of a detent 61g which engages a notch 61h formed in the valve stem. This detent comprises one arm of a bell-crank pivoted at 61j, the other arm of the bell-crank carrying an armature 61k which is acted upon by the electromagnet 62. This electromagnet is connected in series with the beacon light E (see Fig. 1) or other apparatus requiring a flow of current. When the circuit is closed, armature 61k will be moved downwardly against the action of a spring 61m, withdrawing the detent 61g from the notch in the valve stem. The pressure in the air flask will immediately force the valve downwardly against the action of spring 61e, the tension on the latter spring being insufficient to close or maintain closed the valve, except when the air pressure within the flask is practically exhausted. When such pressure reduction occurs, the valve will be closed by spring 61e and locked in closed position by the detent 61g, the flask thereafter being again charged by the continuous operation of the pendulum-driven pump. In this manner the energy of the wave motor over extended periods of time will store up compressed air in the flask, this energy being released to drive the generator G when an electrical load requires the delivery of considerable current. As will hereinafter appear, the beacon light E, and also the wireless transmitting apparatus D, will, under normal conditions, only be used for comparatively short periods, and consequently the energy storing capacity of the air flask 58 will be adequate to serve the intermediate demands of the system. The air motor 60 shown in Fig. 1 is of the turbine type, although any suitable form of air driven motor may be employed.

The automatic timing apparatus for controlling the action of the beacon light E and the wireless transmitter D, as shown in Figs. 3, 4 and 5, comprises a spring motor having a spring-driven barrel 65, the spiral springs 66 housed therein being connected externally to the barrel and internally to a central shaft 67, through which shaft the springs are wound, as will hereinafter be set forth. In accordance with usual practice, the speed of the spring motor is controlled by a governor, which, in the present embodiment, comprises a rotatable vane 68 geared to the spring barrel 65 through a train of gears 69 so as to be revolved by the action of the springs at a very high rate of speed when the spring barrel is revolving slowly. Because of the extremely high gear ratio between the spring barrel and the vane controlling its movement, the torque which the springs impose upon the shaft 70 carrying the vane is very slight and the resistance which the surrounding area offers to the rotation of the vane is sufficient to prevent the shaft 70 from rotating faster than the limiting speed for which the governor is designed.

Upon an intermediate shaft 71 which is rotated by the several gears in gear train 69 which are interposed between said shaft and the spring barrel, a rotary switch or circuit interrupting device J is mounted, the function of which is to control the wireless transmitting apparatus D, causing the latter to continuously transmit a call letter or signal distinguishing the particular depot in which the apparatus is mounted. The circuit interrupter comprises a disk 72 of insulating material, the periphery of which carries a series of contacts 73 arranged at suitable intervals to produce the desired signal. These contacts are connected to a collector ring 74 which is in permanent contact with a collector brush 75. The circuit is completed through the circuit breaker J by a brush 76 which is adapted to bear against the periphery of the disk 72. When the disk is rotated, the contacts 73 successively engage brush 76 and thereby periodically make and break the circuit in accordance with the required signal. This circuit controlling apparatus is connected across the leads 78, 79 which control the emission or modulation of the wireless transmitting apparatus D, the arrangement being such that when a connection is established between the leads 78 and 79 a signal will be emitted from the transmitter. A connection between these leads may be also established by the transmitter key 12 hereinbefore referred to, when the station is under direct manual control, and as will hereinafter more fully appear, such connection may also be established by the relay device B controlled by the wireless receiving apparatus A. In other words, the transmitter D may be controlled by three means; either automatically by the circuit controlling or automatic signaling device J, by the manually controlled key 12, or the relay B, which, in turn, is controlled by a distant wireless transmitter.

It will be observed that the brush 76 which cooperates with the circuit controlling disk 72 is mounted upon the plunger 80 of a solenoid 81, the arrangement being such that when the solenoid is energized, the brush is withdrawn from the circuit controlling disk of the automatic signaling device. The solenoid is controlled by the relay B, and a dash-pot 82 retards the movement of the plunger 80 to the left, so that after the relay B has momentarily energized the solenoid and caused the plunger to withdraw contact 76 from the disk 72, the connection between the said disk and contact will not again be immediately reestablished but will be delayed by the action of dash-pot 82 after the solenoid circuit is broken. The dash-pot plunger 83 is connected through arms 84 and 85 to a rod 86 extending from the solenoid plunger 80. The arms 84, 85, being rigidly connected to a rotatable transverse shaft 87, form virtually a bell crank. When the solenoid plunger is moved to the right, the dash-pot plunger is raised and vice versa, the upward movement of the dash-pot plunger 83, and consequently the movement of the solenoid plunger 80 to the right being resisted by the action of a spring 88. This spring will therefore cause the reengagement of contact 76 with the signal timing disk 72 whenever solenoid 81 is deenergized, the period required for this action being governed by the dash-pot 82. This arrangement permits of the use of the apparatus as a relay or re-transmitting station without interference from the automatic signal transmitter J. When a remote station uses the apparatus in this manner, the incoming signals picked up by the receiver A cause the relay B to make and break at a rapid rate, connections between the transmitter leads 78 and 79, the signals being in the usual form of dots and dashes used in wireless communication. As shown to the left in Fig. 5, the relay B comprises an electromagnet 90 controlled by the output of the receiver A. A resiliently mounted armature 91 pivoted at 92 actuates the movable contact 93 which is connected directly to the transmitter lead 78. A stationary contact 94 connected to the transmitted lead 79 is engaged by the said movable contact whenever the armature is attracted by the electromagnet. In this manner signals picked up by the receiver A will be imposed upon the transmitter D through the action of relay B.

The solenoid 81, which, when energized, withdraws the contact 76 from the automatic signal transmitting disk, is also controlled by the relay B, the solenoid circuit being completed through a stationary contact 95 which is connected through a battery 15 to one of the solenoid leads 80 97, the other solenoid lead 98 being connected to the aforesaid stationary contact 94, and between which contact and contact 95 the movable relay contact 93 is adapted to provide a connection. With this arrangement, it will be apparent that if the dash-pot 82 is designed to prevent the re-engagement of contact 76 with the automatic signal transmitting disk for periods in excess of the normal periods between consecutive signals as used in wireless telegraphy, the automatic signal transmitter will never become operative during the use of the apparatus as a relay or re-transmitting station because there will not be sufficient time between consecutive signals for the dash-pot to permit the re-engagement of contact 76 with the automatic transmitting disk.

If the wireless operator in an airplane, for example, does not desire to use the depot for a relay or re-transmitting station, but desires merely to set the automatic signaling apparatus in operation so that he may ascertain by means of a wireless compass or otherwise the location of the depot or the location of his machine with respect to the depot, he merely sends out a signal on the wave length to which the depot receiver A is tuned. The signal acts upon the relay B, and in a manner which will presently be described releases or sets in motion the automatic signaling device hereinbefore described. If he does not thereafter continue to send out signals at frequent intervals, the dash-pot 82 will in a few seconds permit the contact 76 to engage the disk 72 and thereafter, as long as the spring motor continues to rotate the disk or until the distant operator desires to make use of the depot for the purpose of relaying a message, the transmitter D will continuously send out the distinguishing call letter of the depot.

The spring-driven timing mechanism is set in motion by the action of solenoid 81 when the solenoid is actuated by a relayed signal. As hereinbefore set forth, the rod 86 is moved to the right, this motion, through arm 85, causing a clockwise rotation of shaft 87. Extending to the right from said shaft, an arm 99 engages the bottom of an elongated notch 99' in a vertically slidable bar 100. This bar is urged upwardly by a spring 101 acting against the lower end thereof, while at the upper end of the bar a lever 102 is connected, the lever being pivoted at 103 and providing at its free end a detent 104 which is adapted, when the lever is in the position indicated in dotted lines (Fig. 5), to restrain the speed-controlling vane 68 of the spring-driven timing device whereby the movement of the timer is prevented. When the vertical bar 100 and the lever 102 connected thereto are in the position indicated in solid lines, the detent 104 does not lie in the path of the spinning vane 68, and consequently the timing device is free to be rotated by the spring motor. The bar and lever, as above set forth, are shifted to this latter position whenever an incoming signal causes the energization of solenoid 81.

A spring-pressed detent in the form of a bell crank 106, and pivoted at 107, engages a shoulder 108 on the vertically slidable bar 100 when the parts are in the position shown in Fig. 5. The said detent retaining the bar and consequently the lever 102 in a position to permit the continued rotation of the timing mechanism after the arm 99 controlled by the solenoid has returned to its position of rest.

The vertically slidable bar 100, in addition to controlling the movement of the spring-driven timing mechanism, also actuates a movable contact 110 which controls the primary supply of current to the transmitter D. This contact engages a stationary contact 111 when the bar is moved downwardly by the action of solenoid 81, whereby the battery circuit is closed and the transmitter made ready for the transmission of signals.

It would obviously be very wasteful to leave the transmitter energized continuously whether it were in use or not. To avoid such disadvantage, means actuated by the timing mechanism C are provided to disconnect the batteries from the transmitter after a predetermined interval has elapsed from the starting of the timing mechanism, the same means also being utilized to control the beacon light and for a like purpose. The mechanism for accomplishing this result, as shown in Figs. 3 and 5, comprises a toothed disk 115 which is propelled at a slow speed through gearing connected to the spring barrel 65. One arm 116 of a bell crank pivoted at 117 carries a tooth 118 which is adapted to follow the toothed contour of disk 115. When the spring motor is in operation the disk is driven counter-clockwise, as indicated by the arrow in Fig. 5. The teeth on the disk are so formed as to provide inclined faces 119 which successively lift arm 116 when the disk is rotated, the arm dropping after each tooth passes beneath it. A movable contact 120 carried by arm 116 is thus caused by the rotation of the toothed wheel to periodically engage a stationary contact 121 and thereby to complete the circuit which controls the beacon light E. The arrangement and dimensions of the teeth may obviously be such as to cause the beacon light to flash a desired call letter or signal distinguishing the station. This automatic flashing of the beacon light will continue as long as the timing device is permitted to run.

At one or more than one point around the periphery of toothed disk 115 a timer stop notch 122 is provided, this notch being considerably deeper than the depth of the teeth 119 which control the flashing of the beacon light. A spring 123 acting upon arm 124 of the bell crank causes the tooth 118 on the other arm of the bell crank to descend into the bottom of the aforesaid stop notch 122 when the notch is carried thereunder by the movement of disk 115. For a purpose that will be apparent in considering the following description of the parts actuated by bell crank 116, 124, the tension of spring 123 must exceed the tension of spring 106' connected to the detent 106 previously described. When this occurs, the lower end of bell crank arm 124 moves to the right, the motion being transmitted through a connecting rod 125 to a second bell crank having arms 126, 126' rigidly connected through rock shaft 126" and, which, in turn, moves a vertical rod 127 upwardly. The lower end of the latter rod is slotted to receive a pin 128 carried by the horizontal arm of the bell crank which controls the movement of detent 106, as hereinbefore set forth.

The slot 129 at the lower end of rod 127 is of sufficient length to permit the free movement of the parts connected to the bell crank arm 116 occasioned by the relatively limited action of teeth 119 in making and breaking the beacon light circuit. When the stop notch 122 comes under the teeth 118 and arm 116, a comparatively large movement will be given to the parts connected to said arm and the vertical rod 127 will be raised sufficiently to cause the bottom of slot 129 to strike pin 128 and swing the bell crank upon which the pin is mounted, counter-clockwise, thereby withdrawing detent 106 from the shoulder 108 of the vertical bar 100. The bar being thus released, will be forced upwardly by the action of spring 101, as hereinbefore set forth, resulting in the breaking of the battery circuit which feeds the radio transmitter D (because of the separation of contacts 110, 111), and at the same time the detent 104 carried at the end of lever 102 connected to said vertical bar will be caused to descend and engage the spinning vane 68, whereby the timing mechanism will be brought to rest. In this condition, except for the comparatively small current required to continuously energize the wireless receiving apparatus A, there will be no consumption of energy by the apparatus, the wireless transmitter and also the beacon light being disconnected from the current supply and remaining so until again being put in operation by an incoming signal from a remote station, as has been hereinbefore fully set forth.

There remains only to be described the self-winding mechanism by which the spring motor of the automatic timing device is kept wound. The motive power for winding the spring motor is supplied by a pendulum 135 which is universally mounted upon a ball and socket joint 136. The ball of this joint is formed at the lower end of a rigid vertical rod 137, upon which is slidably mounted a sleeve 138 having at its lower end a flat disk portion 139. At the upper end of the swinging pendulum rod 140 a disk 141 having spherically convex arcuate surface 142 is rigidly mounted, this disk cooperating with the said slidably mounted disk 139 to reciprocate the latter upon a movement of the pendulum in any direction. The action of the disks when the pendulum is displaced from the neutral position is illustrated in dotted lines in Fig. 4. It will be understood that the mechanism here described is designed to be used in a floating depot which will almost always be subjected to a rocking motion due to the action of the wind and waves, and the pendulum will therefore be caused to move relatively to its mounting at frequent intervals. The motion imparted to sleeve 138 by the oscillation of the pendulum is transmitted through a groove 143 formed in the upper end of the sleeve to a lever 144 fulcrumed at 145, the right hand end of the lever having a fork 146 which carries diametrically-opposed pins 147 engaging the said groove. The left hand end of lever 144 is connected through a resilient coupling 146 and a bell crank 147 to a pawl 148 which engages under the action of spring 148', a ratchet wheel 149. By this arrangement any movement of the pendulum away from its neutral position will cause the pawl to be advanced, i. e., to move to the left, the pawl being returned to its initial position when the pendulum swings back to its neutral position.

The backward movement of ratchet wheel 149 is prevented by a stop pawl 150 which is maintained in engagement with the ratchet wheel by a spring 151. The resilient coupling 146 above referred to comprises a tubular housing 152 connected to a rod 153 pivoted to the end of lever 144. Within this housing a compression spring 154 is provided, the said spring being interposed between the end of rod 153, and a similar rod 153' sliding within the tubular housing and pivoted at its lower end to bell crank 147. The object of this resilient coupling is to insure against overwinding the motor springs which are connected to the ratchet wheel 149. The compression spring 154 is so designed that when the motor springs 66 have been wound to the safe limit, no further motion will be imparted thereto by the action of pendulum 135, because spring 154 is not sufficiently strong to transmit motion against the load of the motor springs when they are thus fully wound.

The ratchet wheel 149 is connected through a train of gears to the large gear 155 which is rigidly mounted upon the shaft 67 and to which the motor springs are fastened. It will be noted that the shaft 67 is connected in the rotative sense to the motor springs 66, the shaft otherwise passing freely through the spring barrel 65 while providing a bearing therefor. The pinion 67' is rigidly mounted upon the hub or boss 67" of the spring barrel, and the shaft rotates independently thereof. The same is true of the large gear 69' at the other end of the spring barrel, so that it will be obvious that the self-winding mechanism actuated by pendulum 135 may wind the motor springs during the operation of the timing mechanism, and such winding action will not in any way interfere with the normal functioning of such mechanism.

The operation of the apparatus hereinbefore described may be summarized as follows:

The wireless receiver A being at all times in continuous operation and attuned to receive signals of a predetermined carrier frequency will, when such signal is received, actuate the relay B, which, in turn, through closing the circuit of solenoid 81, causes the release of the spring-motor driven timing mechanism C and establish the battery connections which feed or energize the wireless transmitter D, placing the transmitter in condition to emit signals either under the control of the automatic signal transmitting disk 72 or under the control of the operator at the remote station. The said operator selects the mode of operation desired. If he wishes to use the depot according to the present invention as a beacon, he merely sends out a single signal or note of the frequency to which the receiver A is tuned. This will cause, through the action of relay B, the mechanism connected with the solenoid plunger 80 to move to the position indicated in solid lines in Fig. 5, the detent 104 being withdrawn from the spinning vane 68, thereby releasing the timing mechanism, the contacts 110, 111 being pressed together to establish the battery circuit feeding the transmitter D, and the said detent and contacts being locked in the indicated position by the engagement of detent 106 with the vertical bar 100 which controls the movement of the detent and contacts. After a comparatively brief period, the dash-pot 82 connected through arms 84, 85 to the solenoid plunger 80, will permit the plunger to move to the left sufficiently to bring contact 76 against the surface of the signal transmitting disk 72, and thereafter, during the operation of the automatic timing mechanism, the characteristic call letter or signal distinguishing the depot will be emitted from the transmitter D. Since the transmitter and receiver are simultaneously in operation, it will be obvious that the usual precautions must be taken to protect the receiver from the radiated energy of the transmitter. The two must be attuned to different wave lengths or frequencies and suitably shielded, as is well understood by those skilled in the art. When the timing mechanism is set in motion, as above set forth, the control disk 115 begins to revolve slowly, its inclined teeth causing arm 116 to periodically move upward, thereby causing contacts 120, 121 to establish at predetermined intervals the circuit which feeds the beacon light E, the teeth being arranged at desired intervals to cause the beacon to repeat the code signal identifying the depot. When the control disk 115 revolves to the point where the stop notch 122 comes under the tooth 118 on arm 116, the timing mechanism will automatically be brought to rest. The exaggerated movement of arm 16 permitted by the greater depth of stop notch 122 is transmitted through arm 124, rod 125, bell crank 126 and rod 127 to the detent 106, withdrawing the latter from shoulder 108 of the slide bar 100, which bar, under the action of spring 101, immediately moves upwardly, and as hereinbefore set forth, causes detent 104 to engage the spinning vane 68, thereby stopping the spring-driven timing mechanism and at the same time separating contacts 110, 111, thus cutting off the current supply to the transmitter D. Upon the subsequent operation of the timer through the reception of a signal, as hereinbefore set forth, the slide bar 100 is maintained in the depressed position by arm 99 which is connected to the dash-pot 82, a sufficient length of time to permit the inclined surface of the stop notch 122 to raise arm 116 and thereby to permit the engagement of detent 106 with the shoulder 108 on the slide bar.

If the operator at the remote station desires to utilize the apparatus at the depot as a relay for his signals, he merely sends a continuous series of signals such as are ordinarily employed in wireless communication. These signals will be sufficiently close together in point of time to prevent contact 76 from engaging the automatic signal transmitting disk 72 because of the retarding action of dash-pot 82, and consequently the incoming signals acting through relay 90 will be reproduced in the transmitter control circuit 78, 79 and relayed or re-transmitted from the depot without any interference whatever from the automatic signaling mechanism 72, 76. When the operator has completed the transmission of his message, the apparatus at the depot will resume its automatic signaling operation until brought to rest by engagement of tooth 118 with stop notch 122 on the control disk, as hereinbefore set forth.

The operation of the automatic pendulum winding mechanism whereby the spring-driven timing apparatus is wound, has been set forth in connection with the description of such mechanism, and the same is true of the motors which drive the current-supplying generators F and G by the action of the wind and waves, and such operation need not be again set forth.

While only a single embodiment of the apparatus according to the present invention has been described and illustrated, it will be understood that the invention is not limited thereto but may be otherwise variously modified and embodied without departing from the spirit thereof, as set forth in the following claims.

What I claim is:

1. Apparatus for aiding aerial and marine navigation, said apparatus including a wireless transmitter, automatic signal timing mechanism adapted to cause said transmitter to send out a succession of signals, a wireless receiver, a relay controlled by signals received by said receiver and controlling the output of said transmitter whereby incoming signals will be relayed by such transmitter, an electric circuit connecting said automatic signal timing mechanism with said transmitter, a self-closing contact controlling said circuit, retarding means to delay the closing of said circuit by said contact, and electromagnetic means controlled by the said energy output of the receiver and adapted to move said contact to disconnect the automatic signal timing mechanism from the transmitter when a signal is received by the receiver, the disconnection being maintained by said retarding means whereby signals received within predetermined intervals one of the other may be relayed by the transmitter without interference by the said automatic signal timing mechanism.

2. Lighting and signaling apparatus for aiding aerial and marine navigation, said apparatus comprising a source of light, timing mechanism adapted when in operation to cause light from said source to flash intermittently in accordance with a predetermined series of code flashes, a wireless receiver, and starting means for said timing mechanism, said means being actuated by the energy output of said receiver when a wireless signal is received, whereby the timing mechanism may be put in operation from a remote transmitting station and will automatically effect the said intermittent flashing of the light, the said apparatus being mounted upon a floating chamber, there being provided a spring motor to drive said timing mechanism, and automatic winding means for said spring motor actuated by the rocking of the floating chamber.

3. Lighting and signaling apparatus for aiding aerial and marine navigation, said apparatus comprising a source of light, timing mechanism adapted when in operation to cause light from said source to flash intermittently in accordance with a predetermined series of code flashes, a wireless receiver, and starting means for said timing mechanism, said means being actuated by the energy output of said receiver when a wireless signal is received, whereby the timing mechanism may be put in operation from a remote transmitting station and will automatically effect the said intermittent flashing of the light, the said apparatus being mounted upon a floating chamber, there being provided a spring motor to drive said timing mechanism, and a pendulum operatively connected to the spring of said motor and adapted to wind the said spring when the pendulum is oscillated by the rocking of the chamber.

4. Beacon and signaling apparatus for aiding aerial and marine navigation, said apparatus including a beacon light, intermittent flasher mechanism for said light adapted when in operation to cause said light to flash distinguishing signals for a predetermined period, a wireless receiver, and means controlled by a signal picked up by said receiver to start said flasher mechanism, said flasher mechanism comprising a switch, a motor-driven cam disc having a plurality of cam surfaces adapted to determine the oscillation of said switch in accordance with a predetermined series of signals, stop means to arrest the movement of said disc, and said disc being provided with at least one cam contour adapted to bring said stop means into action whereby the movement of the disc will be checked after a predetermined angular displacement thereof.

5. Wireless beacon and relay apparatus for aiding navigation and relaying wireless signals transmitted from craft, said apparatus comprising a local wireless transmitter, relay means adapted to impress the variations of the energy radiated by a remote transmitter upon said local transmitter whereby said variations will be retransmitted, local automatic signaling mechanism also adapted to control said local transmitter, and local means controlled by a remote transmitter and adapted to prevent the operation of said local automatic signaling mechanism when the said local transmitter is functioning as a retransmitter.

RUBINO PLASTINO.